T. C. GRIERSON.
PIPE COUPLING.
APPLICATION FILED APR. 26, 1905.
959,854.
Patented May 31, 1910.
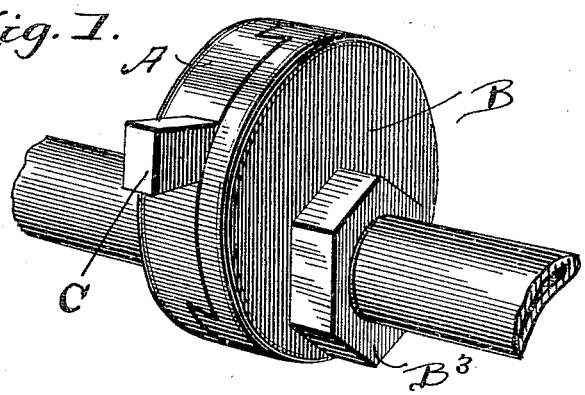
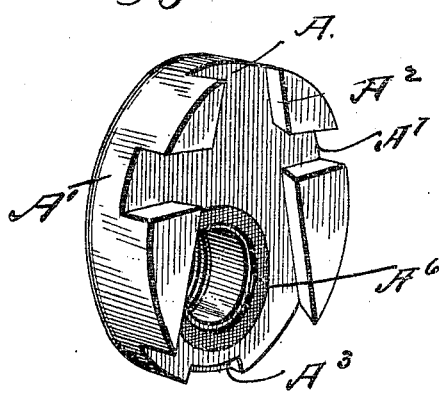
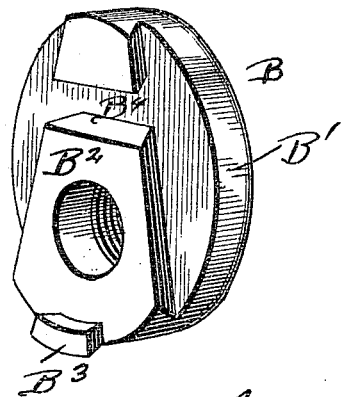
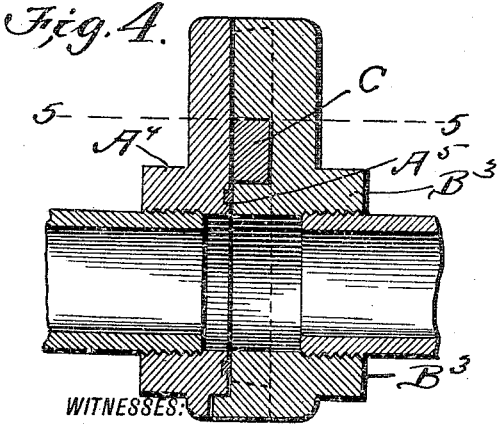
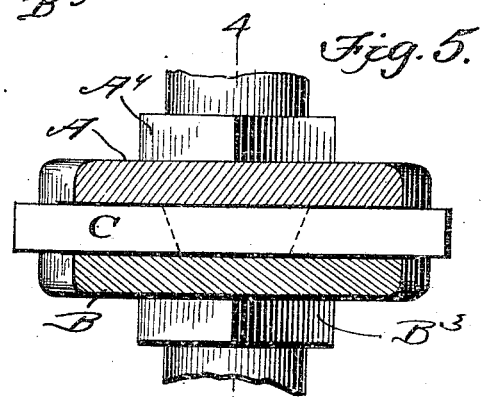
WITNESSES:
M. D. Blondel
Geo. P. Wright
INVENTOR
T. C. Grierson.
BY
Omond & Brock
ATTORNEYS

UNITED STATES PATENT OFFICE.

THOMAS C. GRIERSON, OF EVELETH, MINNESOTA.

PIPE-COUPLING.

959,854.  Specification of Letters Patent.  Patented May 31, 1910.

Application filed April 26, 1905. Serial No. 257,465.

*To all whom it may concern:*

Be it known that I, THOMAS C. GRIERSON, a citizen of the United States, residing at Eveleth, in the county of St. Louis and State of Minnesota, have invented a new and useful Pipe-Coupling, of which the following is a specification.

My invention relates to certain new and useful improvements in pipe couplings, and has for its object to provide a coupling that will be cheap in construction, and one that can be easily assembled.

The object of my invention is to provide a coupling that can be put together or taken apart without the use of a wrench and one that when coupled and locked firmly will form a water tight coupling without the use of rubber gaskets.

With these objects in view my invention consists of the novel construction of parts hereinafter more fully described and shown in the accompanying drawing, in which:—

Figure 1 is a perspective view of the coupling. Fig. 2 is a detail perspective view of one of the sections detached. Fig. 3 is a detail perspective view of the other section detached. Fig. 4 is a longitudinal sectional view of the coupling. Fig. 5 is a sectional view taken on line 5—5 of Fig. 4.

Referring to the drawings, A represents one of the connections of the coupling which is composed of a circular disk A', provided with a dove-tail slot $A^2$, having beveled walls on its face, and provided with a recess $A^3$. A boss $A^4$, is formed on the rear of the disk, provided with a circular opening leading into the dove-tail slot on the face and adapted to receive the end of a pipe that is to be coupled. An annular recess $A^5$, surrounds the opening, in the dove-tail slot $A^2$, and is filled with some soft metal forming a metal gasket $A^6$, so that when the parts are assembled a water tight joint is formed. The face of the disk is also provided with a transverse wedge-shaped slot $A^7$, adapted to receive a key, as will be hereinafter more fully described.

B, represents the other connection of the coupling composed of a circular disk B', the face of the disk being provided with a boss $B^2$, of a dove-tail form, the sides of which are beveled to correspond to the bevel of the wall of the dove-tail slot $A^2$, and is provided with a lug $B^3$, adapted to fit within the recess $A^3$, of the section A, when closed. The disk is provided with an extension $B^3$, on the rear, having a circular opening leading through the disk to the face of the projection $B^2$, and is adapted to receive the end of the pipe to be coupled. The projection $B^2$, is provided with a transverse wedge-shaped slot $B^4$, registering with the slot $A^7$, of the other section when assembled and the two sections are securely locked together by a wedge-shaped key C, which passes through the slots formed in the disk.

Having thus fully described my invention, what I claim as new and desire to secure by Letters Patent is:—

As a new article of manufacture, a detachable pipe coupling formed of two disks of equal size having integral bosses provided with threaded openings adapted to receive the respective ends of the pipes to be connected, one of said disks being provided with a dove-tail shaped slot in its face opposite the boss, the walls of which are provided with notches of unequal size forming a transverse groove, the edge of said disk being provided with a notch at the larger end of said dove-tail groove, the other disk being provided with a dove-tail tongue formed on its inner face adapted to fit within said groove and provided with a lug adapted to fit within the notch of said disk, said tongue being provided with a tapering transverse groove adapted to register with the grooves of the first mentioned disk when said disks are forced together, a wedge-shaped pin adapted to be driven through said transverse groove for locking said disks together, the first mentioned disk being provided with an annular groove adapted to receive a washer for co-acting with the second mentioned disk so as to form a water-tight joint between the same.

THOMAS C. GRIERSON.

Witnesses:
 WM. N. ROWE,
 VIVIAN PRINCE.